United States Patent [19]

Weik

[11] 4,277,103
[45] Jul. 7, 1981

[54] AIRCRAFT SEAT WITH PELVIC PAD

[75] Inventor: Kirby B. Weik, Litchfield, Conn.

[73] Assignee: Koehler-Dayton, Inc., New Britain, Conn.

[21] Appl. No.: 42,329

[22] Filed: May 25, 1979

[51] Int. Cl.³ .......................... A47C 7/16; A47C 7/22; A47C 7/02
[52] U.S. Cl. .................................. 297/457; 297/452; 297/458; 297/459
[58] Field of Search ................ 244/132; 297/452, 445, 297/454, 455, 456, 458, 459, 460, 457

[56] References Cited

U.S. PATENT DOCUMENTS

| | | | |
|---|---|---|---|
| 1,540,105 | 6/1925 | Cook, Jr. .............................. | 244/132 |
| 2,319,455 | 5/1943 | Hardman .......................... | 244/132 X |
| 2,325,270 | 7/1943 | Oermann .......................... | 297/457 X |
| 2,818,107 | 12/1957 | Thaden ............................. | 297/457 X |
| 3,043,624 | 7/1962 | Mason .................................. | 297/452 |
| 3,213,570 | 10/1965 | Abramson, Jr. ...................... | 297/452 |
| 3,273,877 | 9/1966 | Geller et al. .......................... | 297/452 |

*Primary Examiner*—James T. McCall
*Attorney, Agent, or Firm*—Spencer T. Smith

[57] ABSTRACT

A vehicular seat comprising a seat portion made from a sheet of aluminum or the like, including a first substantially horizontally extending portion at the front of the seat, a second rearwardly declining portion defining the rear portion of the seat, a "V" shaped channel joining the first and second portions, and a strip of aluminum having a width selected to be wider than the opening of the "V" shaped channel and secured to the first and second portions along either side of the channel.

1 Claim, 1 Drawing Figure

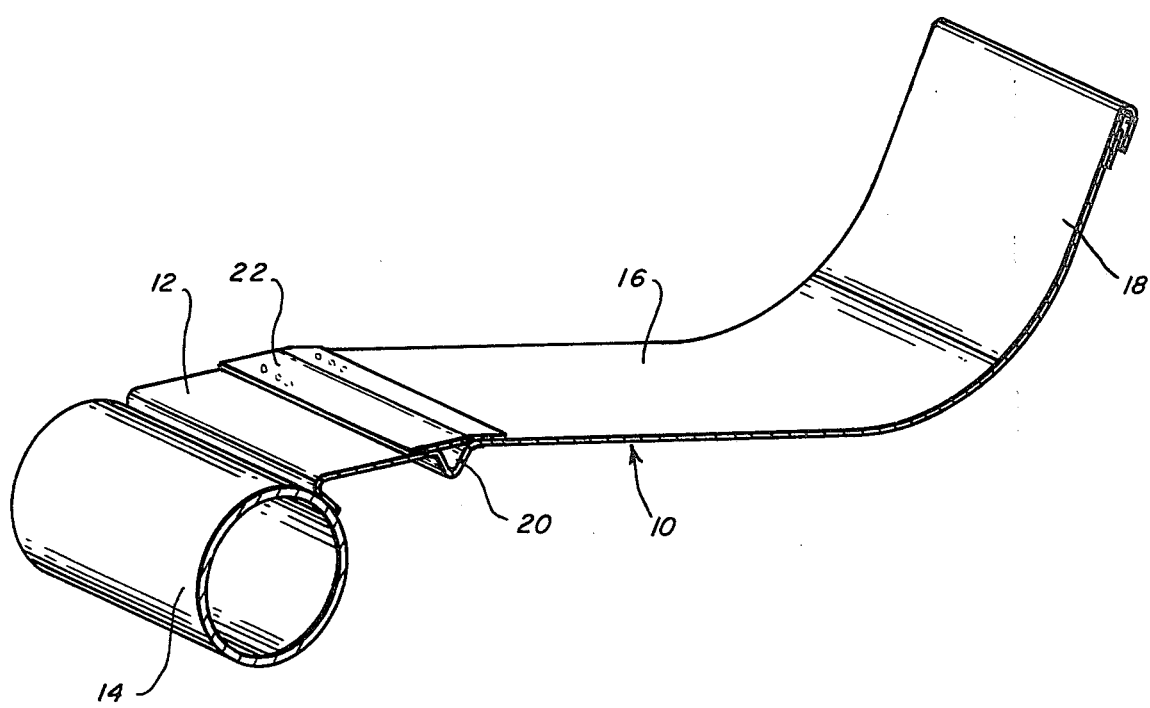

AIRCRAFT SEAT WITH PELVIC PAD

The present invention relates to vehicular seats, and specifically to aircraft seats.

Conventionally, the elimination of excess weight is the foremost consideration in the design of aircraft seats. The structure of the seat member is conventionally an aluminum sheet which is secured to support members. Such a seat provides little comfort to the occupant of an aircraft seat does not prevent pelvic rotation.

It is, accordingly, an object of the present invention to provide an aircraft seat made of aluminum or other light material which is capable of preventing pelvic rotation to increase occupant comfort.

Other objects and advantages of the present invention will become apparent from the following portion of this specification and from the accompanying drawing which illustrates, in accordance with the mandate of the patent statutes, a presently preferred embodiment incorporating the principals of the invention.

The sole FIGURE is an oblique view of the aircraft seat bottom made in accordance with the teachings of the present invention.

In conventional aircraft seats, a sheet of aluminum, which may be in part or entirely filled with perforations to reduce its weight, is strung between supports to define the aircraft seat bottom. When occupied, a depression forms in the seat bottom which has a natural location forwardly of the pelvic region of the occupant. Thus, during occupancy, the pelvic region will naturally move forwardly into the seat bottom depression (often referred to as pelvic rotation). Such a seat bottom, while satisfying engineering dictates for low weight, is uncomfortable.

In contradistinction therewith, in the inventive seat shown in the sole FIGURE in the drawing, the seat bottom provides pelvic support in a most unique manner to prevent pelvic rotation. The bottom section of the seat 10 is formed from a sheet of aluminum which has a first substantially horizontal portion 12 extending from the front support 14 back towards the pelvic area of an occupant of the seat and a second section 16 extending downwardly toward the rear of the seat which merges into an upwardly projecting seat bottom back 18 which is suitably connected to a support (not shown). The continuous sheet of aluminum is bent to incur a substantially V-shaped channel 20 at the juncture of these two sections and a strip of aluminum 22 having a width slightly wider than the opening of this V-shaped channel is secured over the channel by welding or rivetting the strip 22 along the sides of this channel to form, in effect, a structural element made of aluminum which functions to maintain the relationship between the seat portions 12 and 16 and to provide additional lateral support. This construction establishes the natural seat bottom depression location proximate the pelvic region thereby preventing pelvic rotation. Since all that is added to the seat bottom is this single strip of aluminum, there is little increase in weight, yet a pelvic support or pad is defined which substantially improves occupant comfort.

What is claimed is:

1. A vehicular seat comprising a sheet of aluminum or the like including, a first horizontally extending substantially planar portion at the front of the seat, a second portion rearwardly declining at a selected angle relative to said first portion defining the rear portion of said seat, and a "V" shaped channel joining said first and second portions, and a strip of aluminum, having a width selected to be wider than the opening of said "V" shaped channel, and secured to said first and second portions along either side of said channel for maintaining said selected angle between said first and second portions and for defining with said sheet a tubular element to maintain said first portion substantially planar.

* * * * *